US011803733B2

(12) United States Patent
Xie et al.

(10) Patent No.: US 11,803,733 B2
(45) Date of Patent: Oct. 31, 2023

(54) METHOD FOR IMPLEMENTING NEURAL NETWORK MODEL IN HETEROGENEOUS COMPUTING PLATFORM AND APPARATUS FOR PERFORMING THE SAME

(71) Applicant: SAMSUNG ELECTRONICS CO., LTD., Suwon-si (KR)

(72) Inventors: Fengtao Xie, Xi'an (CN); Ke Lu, Xi'an (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 387 days.

(21) Appl. No.: 16/983,520

(22) Filed: Aug. 3, 2020

(65) Prior Publication Data
US 2021/0034950 A1 Feb. 4, 2021

(30) Foreign Application Priority Data
Aug. 1, 2019 (CN) .......................... 201910705424.0
Jul. 29, 2020 (KR) .......................... 10-2020-0094446

(51) Int. Cl.
*G06N 3/04* (2023.01)
*G06N 3/045* (2023.01)

(52) U.S. Cl.
CPC .................................. *G06N 3/045* (2023.01)

(58) Field of Classification Search
None
See application file for complete search history.

(56) References Cited

U.S. PATENT DOCUMENTS

| 9,558,748 B2 | 1/2017 | Lane et al. |
| 10,002,402 B2 | 6/2018 | Liu et al. |
| 2016/0379108 A1 | 12/2016 | Chung et al. |
| 2019/0073590 A1 | 3/2019 | Wu et al. |
| 2020/0249998 A1* | 8/2020 | Che .................... G06N 3/0454 |

FOREIGN PATENT DOCUMENTS

CN          107515736 A          12/2017

OTHER PUBLICATIONS

Zhang et al, "A Fuzzy Neural Network Based Dynamic Data Allocation Model on Heterogeneous Multi-GPUs for Large-scale Computations", 2018, International Journal of Automation and Computing, all pages (Year: 2018).*
Du et al, "Model Parallelism Optimization for Distributed Inference Via Decoupled CNN Structure", Jul. 2021, IEEE Transactions on Parallel and Distributed Systems, vol. 32, all pages (Year: 2021).*

* cited by examiner

*Primary Examiner* — Daniel C Puentes
(74) *Attorney, Agent, or Firm* — NSIP Law

(57) ABSTRACT

A method and apparatus for implementing a neural network model in a heterogeneous computing platform are disclosed. The method includes partitioning a neural network model into first sub-models based on a partition standard, obtaining second sub-models by merging at least a portion of the first sub-models based on characteristics of the first sub-models, and deploying the second sub-models.

24 Claims, 14 Drawing Sheets

Neural network model

Partition into first sub-models

Merge into second sub-models and deploy

Neural network model

⇩

Partition into first sub-models

⇩

Merge into second sub-models and deploy

METHOD FOR IMPLEMENTING NEURAL NETWORK MODEL IN HETEROGENEOUS COMPUTING PLATFORM AND APPARATUS FOR PERFORMING THE SAME

CROSS-REFERENCE TO RELATED APPLICATIONS

This application claims the benefit under 35 USC § 119(a) of Chinese Patent Application No. 201910705424.0 filed on Aug. 1, 2019, in the China National Intellectual Property Administration and Korean Patent Application No. 10-2020-0094446 filed on Jul. 29, 2020, in the Korean Intellectual Property Office, the entire disclosures of which are incorporated herein by reference for all purposes.

BACKGROUND

1. Field

The following description relates to a method of implementing a neural network model in a heterogeneous computing platform and an apparatus performing the same.

2. Description of Related Art

The improvement of computing power and the development of scientific computing have contributed to the widespread use of recognition technology such as image recognition and voice recognition. As the demand for increased recognition speed and accuracy grows, technical experts and engineers have developed a neural network. A hardware-and/or software-based design method is used to improve the performance of a neural network when it is implemented in hardware.

To improve the performance of a neural network the hardware-based design method has been adopted. The hardware-based design method may improve the performance of a neural network by designing hardware as a configurable system-on-chip (SOC) or through hardware programming. In the case of such a method of designing hardware as an SOC, a chipset having various performance characteristics may be included in the SOC and a corresponding driver and software may need to be supported during the use of the SOC. When a neural network is executed in the SOC, hardware may transmit tasks that are different by task types to designated processors to complete a related computation. In addition, in the case of such a hardware programming method, a related computation for a designated neural network may be set in advance in an instruction for execution through a hardware programming language, and data may be transmitted to corresponding hardware during the execution. Thus, the hardware may perform a computation task related to the neural network based on the preset instruction for execution.

In addition, to execute a neural network in a heterogeneous platform, the software-based design method may be adopted. The software-based design method may encode each execution task of a neural network by using an open computing language (OpenCL) and write OpenCL kernel codes different for each hardware through an OpenCL function of supporting some mainstream processors, thereby enabling the neural network to be executed in the heterogeneous platform. In addition, in the case of designing an execution framework, such OpenCL codes may be retrieved separately based on an operation type or an amount of resources used, thereby enabling the heterogeneous execution of the neural network in the existing mainstream processors.

However, the hardware-based design method and the software-based design method described above may have the following issues.

There may be a relatively low resource utilization rate. For example, the configurable hardware may improve the execution efficiency of a neural network or reduce the energy consumption of the neural network to some extent. However, in actual implementation, a lot of hardware may be idle, increasing a hardware cost.

In addition, there may be a lack of flexibility. For example, a model may change as many designs are directly programmed for the model, and thus re-programming may be needed. However, as a model has increased in number of operations and become more complicated, such methods may need more tasks for development, and repair and maintenance, and a task efficiency may be degraded considerably.

Moreover, there may be an issue in supporting a specific type of hardware and software. Although the hardware-based heterogeneous platform implementation requires the support of a specific SOC, a current mainstream embedded device may be in a more traditional multi-processor architecture. The software-based design method requires a software designer to use a cross-platform language such as the OpenCL, which may be applicable only to hardware supported by the OpenCL. However, new hardware may have a special compiler and an instruction set, which is completely different from an existing programming method. Thus, such hardware may not operate with another processor through an existing software architecture.

Therefore, there is a desire for a method and apparatus for overcoming the issues described above and effectively operating a neural network in a heterogeneous platform.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method of implementing a neural network model includes partitioning a neural network model into first sub-models based on a standard for the partitioning, obtaining second sub-models by merging at least a portion of the first sub-models based on characteristics of the first sub-models, and deploying the second sub-models.

The partitioning may include partitioning the neural network model into the first sub-models based on at least one of the number of times of an operation of an operating segment included in the neural network model, an input data size, or an output data size.

The partitioning may include verifying the first sub-models, and modifying the standard for the partitioning in response to the first sub-models not satisfying a standard for the verifying.

The verifying may include detecting performances when the first sub-models are executed in an accelerator.

The detecting of the performances may include detecting at least one of a consumed time, a consumed power, or an occupied memory size when each of the first sub-models is executed in an accelerator.

The partitioning may include matching each of the first sub-models to a type of an accelerator in which each of the first sub-models is executed with a specific performance.

The obtaining may include obtaining the second sub-models by merging sub-models among the first sub-models that are adjacent to each other in terms of an execution order and have a specific performance when they are executed in an accelerator of a same type.

The deploying may include writing a heterogeneous graph based on the second sub-models, and deploying the second sub-models based on the heterogeneous graph.

The writing may include writing a connecting relationship between the second sub-models based on an input and output relationship between the second sub-models.

In another general aspect, an apparatus for implementing a neural network model includes a memory configured to store therein instructions and a processor configured to execute the instructions. When the instructions are executed, the processor may partition a neural network model into first sub-models based on a standard for the partitioning, obtain second sub-models by merging at least a portion of the first sub-models based on characteristics of the first sub-models, and deploy the second sub-models.

The processor may partition the neural network model based on at least one of the number of times of an operation of an operating segment included in the neural network model, an input data size, or an output data size.

The processor may verify the first sub-models, and modify the standard for the partitioning in response to the first sub-models not satisfying a standard for the verifying.

The processor may detect performances when the first sub-models are executed in an accelerator.

The processor may detect at least one of a consumed time, a consumed power, or an occupied memory size when each of the first sub-models is executed in an accelerator.

The processor may match each of the first sub-models to a type of an accelerator in which each of the first sub-models is executed with a specific performance.

The processor may obtain the second sub-models by merging sub-models among the first sub-models that are adjacent to each other in terms of an execution order and have a specific performance when they are executed in an accelerator of a same type.

The processor may write a heterogeneous graph based on the second sub-models, and deploy the second sub-models based on the heterogeneous graph.

The processor may write a connecting relationship between the second sub-models based on an input and output relationship between the second sub-models.

The processor may include a plurality of accelerators in which the second sub-models are deployed.

Other features and aspects will be apparent from the following detailed description, the drawings, and the claims.

Figure 1A:
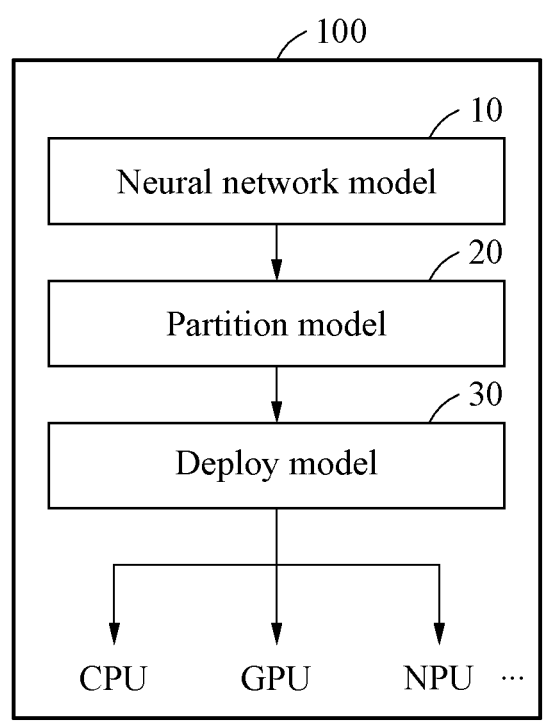
FIGS. 1A and 1B are diagrams illustrating an example of a concept of a neural network implementing method.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

Unless otherwise defined, all terms, including technical and scientific terms, used herein have the same meaning as commonly understood by one of ordinary skill in the art to which this disclosure pertains consistent with and after an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Throughout the specification, when a component is described as being "connected to," or "coupled to" another component, it may be directly "connected to," or "coupled to" the other component, or there may be one or more other components intervening therebetween.

Also, in the description of example embodiments, detailed description of structures or functions that are thereby known after an understanding of the disclosure of the present application will be omitted when it is deemed that such description will cause ambiguous interpretation of the example embodiments. Hereinafter, examples will be described in detail with reference to the accompanying drawings, and like reference numerals in the drawings refer to like elements throughout.

Figure 1B:
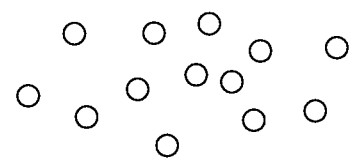
Figure 1B:
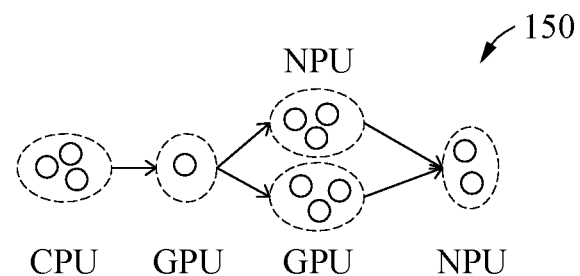

FIGS. 1A and 1B are diagrams illustrating an example of a concept of a neural network implementing method.

Referring to FIGS. 1A and 1B, a neural network model implementing apparatus 100, or an apparatus for implementing a neural network model, may implement a neural network model 10 in a heterogeneous computing platform. In such a heterogeneous platform including various types of accelerators (for example, artificial intelligence (AI) accelerators) the neural network model implementing apparatus 100 may perform a self-adaptive method to effectively execute the neural network model 10 that is trained. The various types of accelerators may include, for example, a central processing unit (CPU), a graphics processing unit (GPU), a neural processing unit (NPU) (or a neural processor), and the like.

A neural network may include a statistical learning algorithm that imitates a biological neural system in machine learning and cognitive science. The neural network may refer to an overall model in which artificial neurons, for example, nodes, forming a network through a synaptic connection therebetween change the strength of the synaptic connection through learning, thereby having a problem-solving ability. While the nodes may be referred to as "artificial nodes" or "neurons," such reference is not intended to impart any relatedness with respect to how the neural network architecture computationally maps or thereby intuitively recognizes information and how a human's neurons operate. I.e., the terms "artificial nodes" or "neurons" are merely terms of art referring to the hardware implemented nodes of a neural network.

The neural network may include a deep neural network (DNN). In addition, the neural network may include any one or any combination of a convolutional neural network (CNN), a recurrent neural network (RNN), a perceptron, a feedforward (FF) network, a radial basis function (RBF) network, a deep feedforward (DFF) network, a long short-term memory (LSTM), a gated recurrent unit (GRU), an autoencoder (AE), a variational autoencoder (VAE), a denoising autoencoder (DAE), a sparse autoencoder (SAE), a Markov chain (MC), a Hopfield network (HN), a Boltzmann machine (BM), a restricted Boltzmann machine (RBM), a deep belief network (DBN), a deep convolutional network (DCN), a deconvolutional network (DN), a deep convolutional inverse graphics network (DCIGN), a generative adversarial network (GAN), a liquid state machine (LSM), an extreme learning machine (ELM), an echo state network (ESN), a deep residual network (DRN), a differential neural computer (DNC), a neural turning machine (NTM), a capsule network (CN), a Kohonen network (KN), and an attention network (AN).

The neural network model implementing apparatus 100 may obtain a partition model 20 based on the neural network model 10. For example, the neural network model implementing apparatus 100 may partition the neural network model 10 into first sub-models, thereby obtaining the partition model 20.

The neural network model implementing apparatus 100 may obtain a deploy model 30 based on the partition model 20. For example, the neural network model implementing apparatus 100 may merge at least a portion of the first sub-models to obtain second sub-models, thereby obtaining the deploy model 30 in which the obtained second sub-models are connected to each other. The deploy model 30 may be represented by a heterogeneous graph 150 to which information of an accelerator in which each of the second sub-models is deployed and a connecting relationship between the second sub-models are applied.

The neural network model implementing apparatus 100 may deploy the deploy model 30 in a heterogeneous platform such that the neural network model 10 is executed with its optimal performance. For example, the neural network model implementing apparatus 100 may deploy each of the second sub-models in an optimal accelerator and execute it based on an execution pipeline determined based on a type of input data, thereby implementing the neural network model 10 with the optimal performance.

Figure 2:
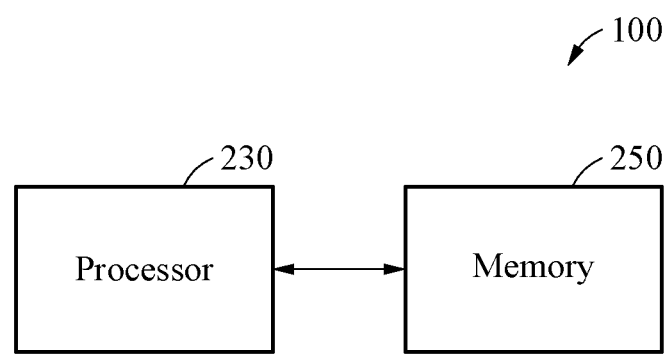
FIG. 2 is a diagram illustrating an example of a neural network implementing apparatus.

FIG. 2 is a diagram illustrating an example of a neural network implementing apparatus.

The neural network model implementing apparatus 100 includes a processor 230 and a memory 250. The processor 230 may execute a computer-readable code (e.g., software) stored in the memory 250 and processor-induced instructions.

The processor 230 may be a data processing device implemented by hardware having a circuit of a physical structure to execute desired operations. For example, the desired operations may include a code or instructions included in a program.

The processor 230 may provide a heterogeneous computing environment. The processor 230 may include different types of accelerators. For example, the processor 230 may provide a heterogeneous computing platform including any one or any combination of a microprocessor, a CPU, a processor core, a multi-core processor, a GPU, an application-specific integrated circuit (ASIC), a field-programmable gate array (FPGA), an NPU, a tensor processing unit (TPU), a vision processing unit (VPU), and a data processing unit (DPU).

The memory 250 may store therein instructions or a program executable by the processor 230. For example, the instructions may include instructions to execute operations of the processor 230 and/or operations of components of the processor 230.

The memory 250 may be implemented as a volatile or nonvolatile memory device.

The volatile memory device may be implemented as a dynamic random-access memory (RAM) (DRAM), a static RAM (SRAM), a thyristor RAM (T-RAM), a zero capacitor RAM (Z-RAM), or a twin transistor RAM (TTRAM).

The nonvolatile memory device may be implemented as an electrically erasable programmable read-only memory (EEPROM), a flash memory, a magnetic RAM (MRAM), a spin-transfer torque (STT) MRAM (STT-MRAM), a conductive bridging RAM (CBRAM), a ferroelectric RAM (FeRAM), a phase-change RAM (PRAM), a resistive RAM (RRAM), a nanotube RRAM, a polymer RAM (PoRAM), a nano-floating gate memory (NFGM), a holographic memory, a molecular electronic memory device, or an insulator resistance change memory.

Figure 3:
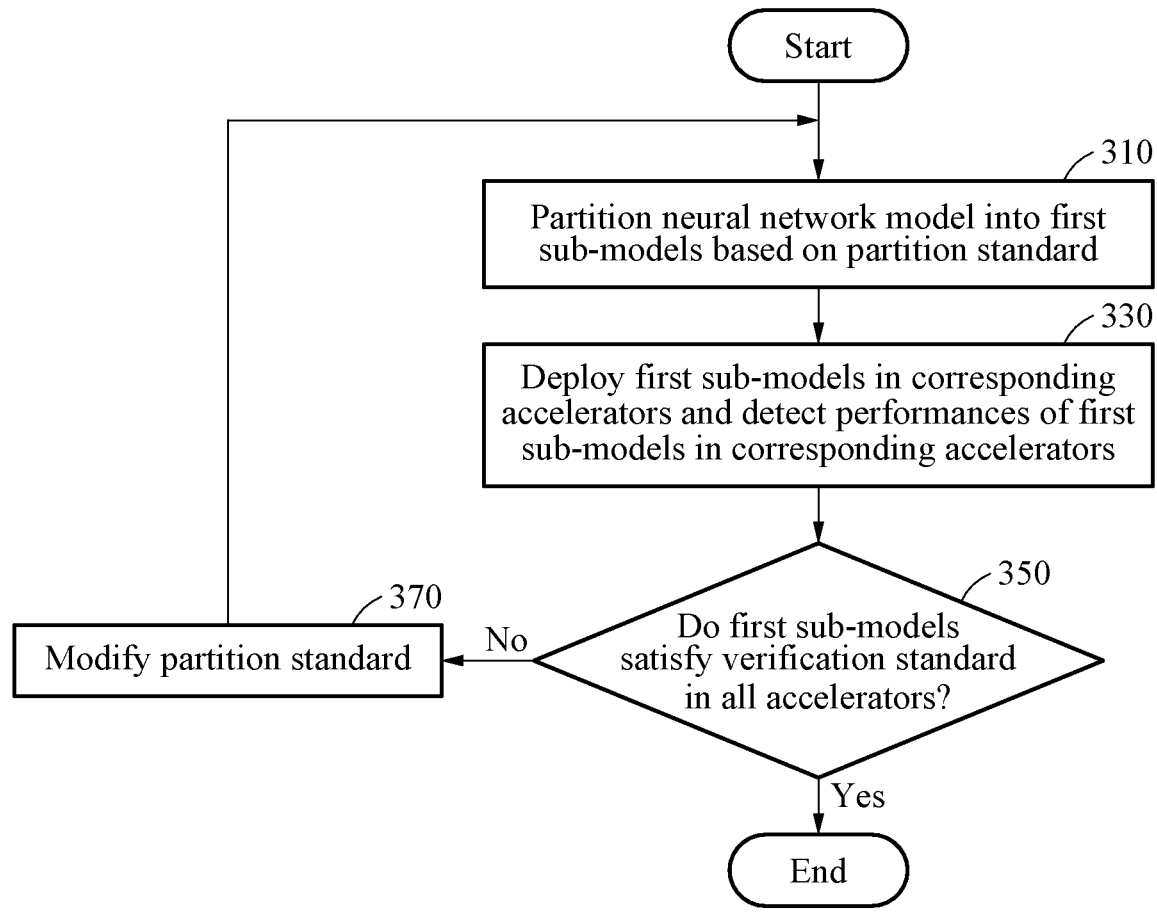
FIG. 3 is a flowchart illustrating an example of a partitioning operation of the neural network implementing apparatus illustrated in FIG. 2.

FIG. 3 is a flowchart illustrating an example of a partitioning operation of the neural network implementing apparatus illustrated in FIG. 2.

In operation 310, the processor 230 partitions the neural network model 10 into first sub-models based on a standard for the partitioning (hereinafter a partition standard). The partition standard may be associated with any one or any combination of the number of times of a multiply-addition (MAdd) operation, an input data size, and an output data size. The first sub-models may be snippets.

An example of an operation performed by the processor 230 to partition the neural network model 10 into the first sub-models based on the number of times of the MAdd operation as the partition standard will be described hereinafter.

The processor 230 may partition the neural network model 10 based on the number of times of the MAdd operation of an operating segment. The processor 230 may obtain the first sub-models by grouping a plurality of operating segments included in the neural network model 10 based on the number of times of the MAdd operation. For example, the processor 230 may obtain the first sub-models by detecting the number (e.g., the total number) of MAdd operations of each of the operating segments and grouping an operating segment having a number of MAdd operations that is less than the partition standard with a successive operating segment.

For example, the partition standard may be 1000 times of the MAdd operation, the neural network model 10 may include five operating segments (e.g., first through fifth operating segments), and the number of MAdd operations of the first through fifth operating segments may be 1005, 900, 200, 1020, and 800, respectively. In this example, the processor 230 may determine the first operating segment as one of the first sub-models, group the second and the third operating segments into another one of the first sub-models, and group the fourth and the fifth operating segments into yet another one of the first sub-models.

For another example, when the input data size or the output data size is used as the partition standard, the processor 230 may partition the neural network model 10 into the first sub-models in the same way as described above.

In this example, the processor 230 may partition the neural network model 10 in different ways based on a type of an input task. For example, the processor 230 may obtain different types of first sub-models based on whether the input task is a single input task or a streaming input task.

When a task type of input data is the single input task, the processor 230 may partition the neural network model 10 into the first sub-models such that the first sub-models include sub-models having a parallel relationship therebetween.

When a task type of input data is the streaming input task, the processor 230 may partition the neural network model 10 into the first sub-models such that the first sub-models do not include sub-models having a parallel relationship therebetween.

That is, according to such different types of input tasks, the processor 230 may partition the neural network model 10 into the first sub-models along different partitioning paths for sub-models having a parallel relationship therebetween.

In operations 330 and 350, the processor 230 verifies the first sub-models. For example, the processor 230 may verify performances of the first sub-models when the first sub-models are executed in accelerators included in the processor 230. Here, a standard for the verifying (hereinafter a verification standard) may be associated with any one or any combination of a consumed time, a consumed power, and an occupied memory size, when each of the first sub-models is executed in each of the accelerators.

In operation 370, when the performances of the first sub-models in the accelerators do not satisfy the verification standard, the processor 230 modifies the partition standard for partitioning the neural network model 10. That is, such a case in which the first sub-models do not satisfy the verification standard may indicate that such a partitioning operation of the processor 230 may be irrational.

The processor 230 may obtain new first sub-models based on the modified partition standard, and repeat such a verifying operation. When the first sub-models satisfy the verification standard, the processor 230 may finally determine the first sub-models.

The verifying operation performed by the processor 230 to verify the first sub-models will be described hereinafter in further detail below with reference to FIGS. 4A and 4B.

The processor 230 may match each of the verified first sub-models to a type of a corresponding accelerator in which each of the first sub-models is executed with its optimal performance. For example, the processor 230 may match each of the first sub-models to one type of the accelerators, for example, a CPU, a GPU, and an NPU, in which each of the first sub-models is executed with its optimal performance. That is, the processor 230 may determine a type of an accelerator in which each of the first sub-models is executed with its optimal performance.

Figure 4A:
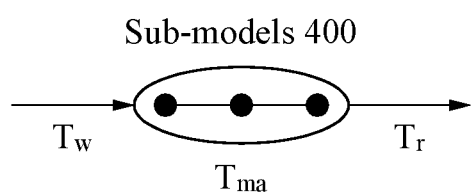
FIGS. 4A and 4B are diagrams illustrating examples of a verifying operation of the neural network implementing apparatus illustrated in FIG. 2.
Figure 4B:
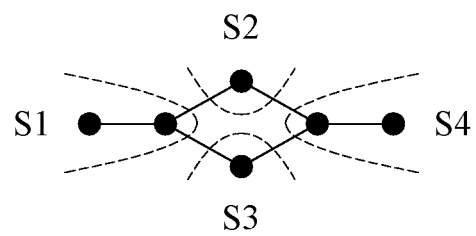

FIGS. 4A and 4B are diagrams illustrating examples of a verifying operation of the neural network implementing apparatus illustrated in FIG. 2.

In operation 330, the processor 230 deploys the first sub-models in each of the accelerators included in the processor 230 and detects performances of the first sub-models in the accelerators. For example, for each of the first sub-models, the processor 230 may detect any one or any combination of a consumed time, a consumed power, and an occupied memory size when the first sub-model is executed in each of the accelerators. In this example, the processor 230 may convert the first sub-models into the form of a model that is executable in an accelerator.

The processor 230 may verify whether the detected performances of the first sub-models satisfy the verification standard. For example, for each of the first sub-models, the processor 230 may verify whether any one or any combination of the consumed time, the consumed power, and the occupied memory size satisfies the verification standard when the first sub-model is executed in the accelerators.

The first sub-models are illustrated as sub-models 400 and as sub-models S1 through S4, respectively, in the examples of FIGS. 4A and 4B. An example in which the verification standard is associated with an amount of time consumed by the sub-models 400 in an accelerator will be further described hereinafter with reference to FIG. 4A. An example in which the verification standard is associated with an amount of time consumed by the sub-models S1 through S4 in an accelerator will be further described hereinafter with reference to FIG. 4B.

Referring to FIG. 4A, for the sub-models 400 of a non-parallel branch structure, the processor 230 may verify whether a first time $T_{ma}$ associated with the sub-models 400 is greater than a sum of a second time $T_w$ and a third time $T_r$ that are associated with the sub-models 400. The first time $T_{ma}$ is an amount of time consumed for a MAdd operation of the sub-models 400. The second time $T_w$ is an amount of time consumed for writing data in the sub-models 400, and the third time $T_r$ is an amount of time consumed for reading the data from the sub-models 400. For example, a verification standard for the sub-models 400 of the non-parallel branch structure may be as represented by Equation 1 below.

$$T_{ma} > T_w + T_r \qquad \text{Equation 1:}$$

Referring to FIG. 4B, for sub-models of a parallel branch structure, the processor 230 may verify the four sub-models S1 through S4 partitioned in the parallel branch structure based on a verification standard represented by Equations 2 and 3 below, for example.

$$T_{mx} = T_{ma} + T_w + T_r, \ x=1,2,3,4 \qquad \text{Equation 2:}$$

$$T_{m1} + \max(T_{m2}, T_{m3}) + T_{m4} < T_{org} \qquad \text{Equation 3:}$$

That is, the processor 230 may obtain respective consumed times $T_{m1}$ through $T_{m4}$ of the sub-models S1 through S4 as represented by Equation 2 above, and verify whether the consumed times $T_{m1}$ through $T_{m4}$ satisfy a condition represented by Equation 3. In this equation, a consumed time Ts denotes an amount of time consumed when the four sub-models S1 through S4 are executed in an accelerator in the form before they are partitioned.

Although the example of verifying the first sub-models using an amount of time consumed by the first sub-models in the accelerators has been described as above, the processor 230 may verify the first sub-models in the same way as described above in a case in which the verification standard is associated with a consumed power or an occupied memory size when the first sub-models are executed in the accelerators. For example, when the verification standard is associated with the consumed power or the occupied memory size, the first time $T_{ma}$ may indicate an amount of power consumed or a memory size occupied by the sub-models 400 for a MAdd operation, and the second time $T_w$ and the third time $T_r$ may respectively indicate an amount of power consumed or a memory size occupied for inputting data in the sub-models 400, and an amount of power consumed or a memory size occupied for reading the data from the sub-models 400, in Equations 1 through 3 above. In addition, the consumed time $T_{org}$ may indicate an amount of power consumed or a memory size occupied by the sub-models S1 through S4 in the form that they are not partitioned.

The processor 230 may perform such a verifying operation in the way as described above based on whether the first sub-models are in the non-parallel branch structure or the parallel branch structure in the accelerators, and finally determine the first sub-models in response to the verification standard being satisfied. That is, the processor 230 may determine the first sub-models before performing a merging operation.

FIGS. 5A through 5E are diagrams illustrating examples of a merging operation of the neural network implementing apparatus illustrated in FIG. 2.

The processor 230 may obtain second sub-models by merging at least a portion of first sub-models. For example, the processor 230 may obtain the second sub-models by merging at least some of the first sub-models that are adjacent to each other (adjacent in terms of an order of execution (hereinafter an execution order)) and that have optimal performances when they are executed in an accelerator of the same type.

Here, there may be some of the first sub-models that are not merged with others of the first sub-models. For example, when other first sub-models adjacent to a first sub-model (adjacent in terms of an execution order) have optimal performances in accelerators of a different type than an accelerator in which the first sub-model has an optimal performance, the first sub-model may not be merged with the other first sub-models. In this example, the first sub-model that is not merged with the other first sub-models may itself be a second sub-model. That is, a second sub-model may include merged first sub-models and another second sub-model may include a non-merged first sub-model.

The processor 230 may determine that a second sub-model obtained by merging first sub-models that are adjacent to each other in terms of an execution order and have optimal performances when they are executed in an accelerator of the same type is the most suitable for the corresponding accelerator.

Here, when a connecting point between the merged first sub-models is used in another first sub-model, the processor 230 may perform such a merging operation such that the connecting point is an output end of the generated second sub-model.

Hereinafter, examples of merging a plurality of first sub-models will be described with reference to FIGS. 5A through 5E. In FIGS. 5A through 5E, first sub-models before merging are illustrated as sub-models S1 through S3 (e.g., positioned to a left of an arrow), and second sub-models are illustrated as a sub-model S' that generated by the merging operation and a sub-model S3 that is not merged after the merging operation (e.g., positioned to a right of an arrow).

Figure 5A:
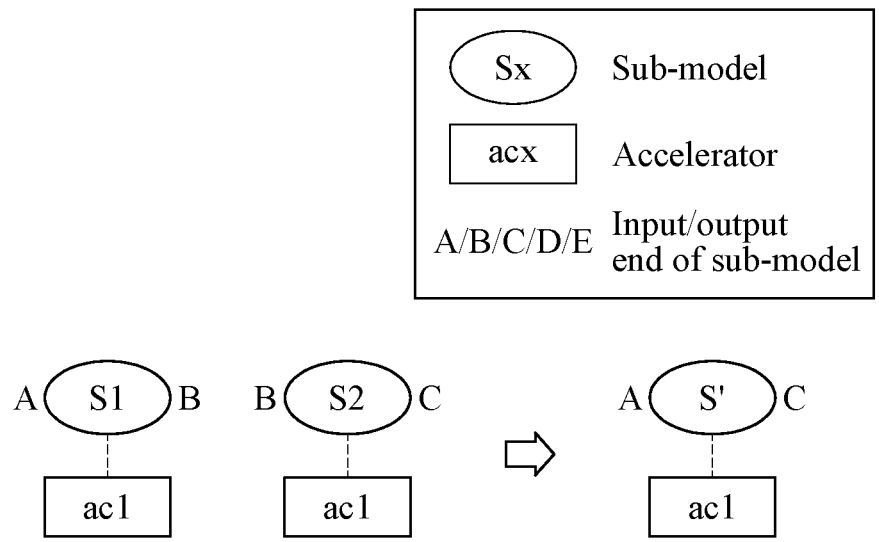
FIGS. 5A through 5E are diagrams illustrating examples of a merging operation of the neural network implementing apparatus illustrated in FIG. 2.

Referring to FIG. 5A, of two sub-models S1 and S2, an output end B of the sub-model S1 and an input end B of the sub-model S2 are the same, and the sub-models S1 and S2 have optimal performances when they are executed in an accelerator ac1. In such a case, when there is not any other sub-model having the same input end B as the input end B of the sub-model S2, the processor 230 may merge the sub-models S5 and S2 into a single sub-model S' having an input end A and an output end C, and determine that the sub-model S1' is the most suitable for the accelerator ac1.

Figure 5B:
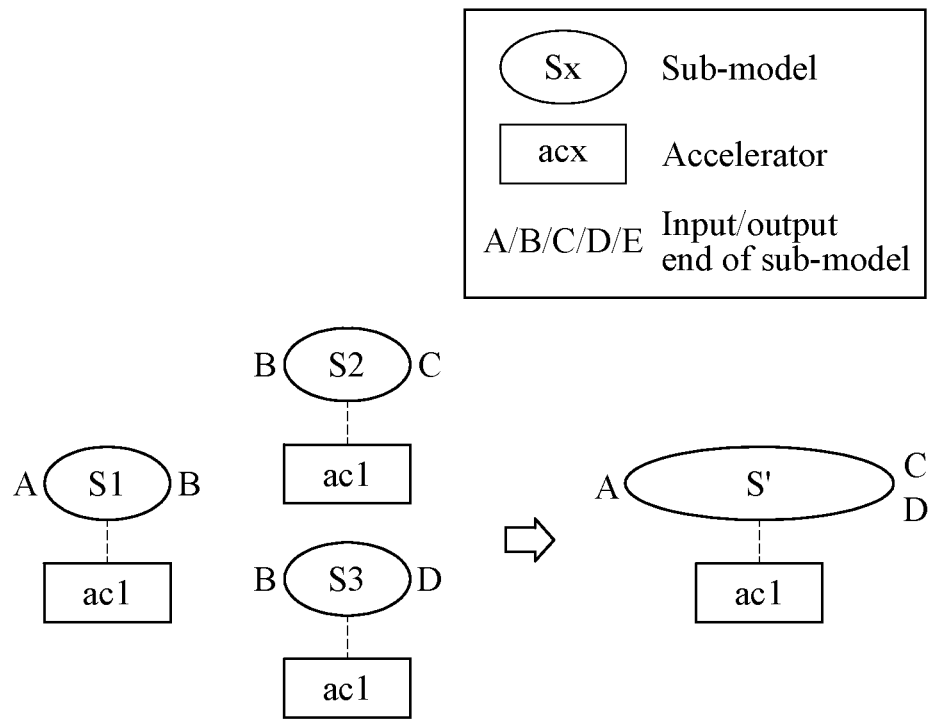

Referring to FIG. 5B, of three sub-models S through S3, an output end B of the sub-model S1 and respective input ends B of the sub-models S2 and S3 are the same, and the sub-models S1 through S3 have optimal performances when they are executed in an accelerator ac1. In such a case, when there is not any other sub-model having the same input end B other than the sub-models S2 and S3, the processor 230 may merge the sub-models S1 through S3 into a single sub-model S' having an input end A and output ends C and D, and determine that the sub-model S' is the most suitable for the accelerator ac1.

Figure 5C:
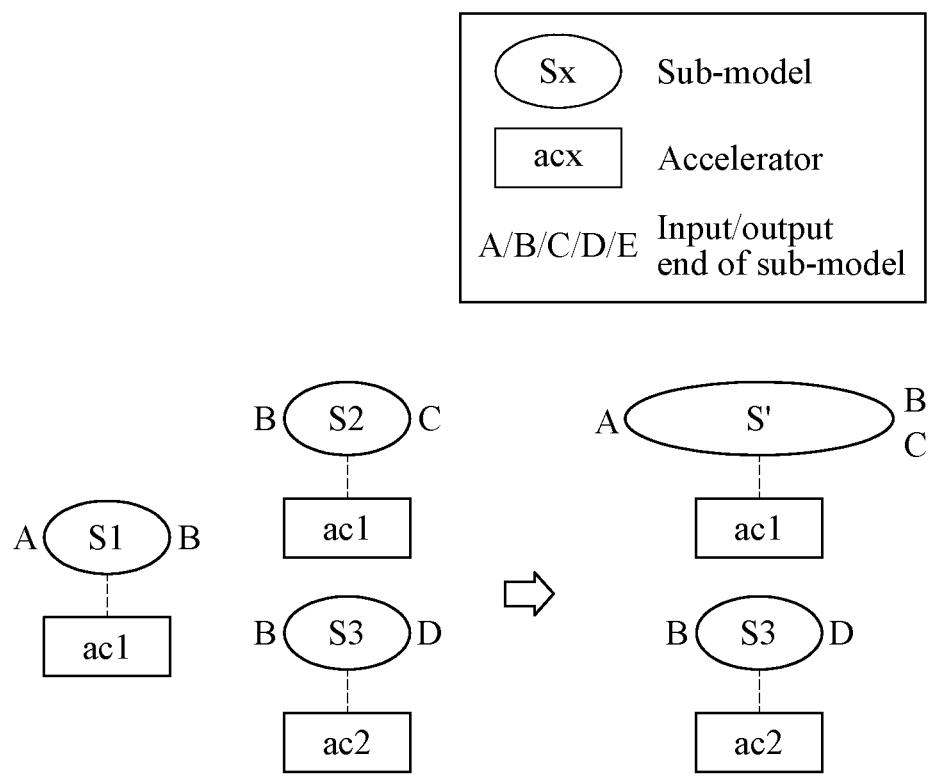

Referring to FIG. 5C, of three sub-models S1 through S3, an output end B of the sub-model S1 and respective input ends B of the sub-models S2 and S3 are the same. The sub-models S1 and S2 have optimal performances when they are executed in an accelerator ac, but the sub-model S3 has an optimal performance when it is executed in an accelerator ac2. In such a case, the processor 230 may merge the sub-models S1 and S2 into a single sub-model S' having an input end A and output ends B and C, and determine that the sub-model S' is the most suitable for the accelerator ac1 and the sub-model S3 is the most suitable for the accelerator ac2. Here, a connecting point between the merged two sub-models S1 and S2, which is the output end B of the sub-model S1, may be used by the sub-model S3, and thus the processor 230 may merge the sub-models S1 and S2 such that the output end B of the sub-model S' is used as an input end of the sub-model S3.

Figure 5D:
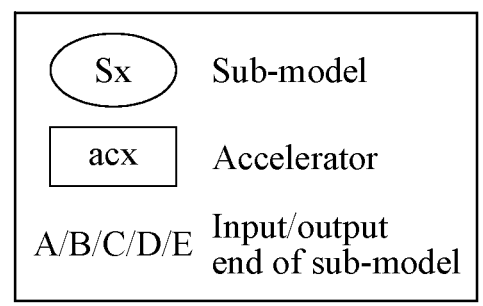
Figure 5D:
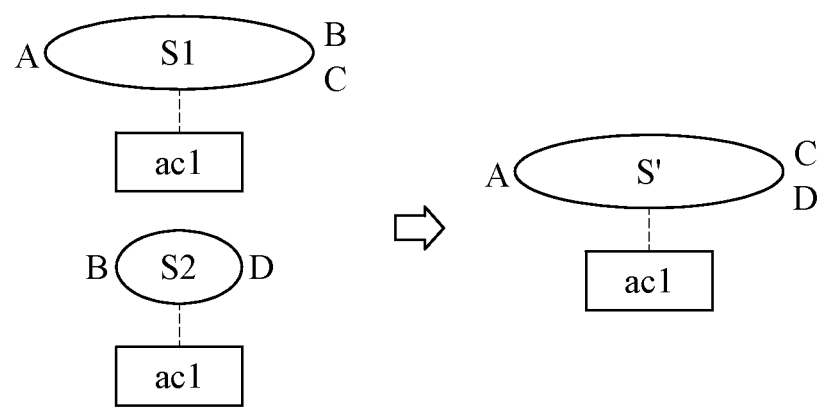

Referring to FIG. 5D, of two sub-models S1 and S2, output ends B and C of the sub-model S1 include an input end B of the sub-model S2 and there are no other sub-models having the same input end B as the sub-model S2. In addition, the sub-models S1 and S2 have optimal performances when they are executed in an accelerator ac1. In such a case, the processor 230 may merge the sub-models S1 and S2 into a sub-model S' having an input end A and output ends C and D, and determine that the sub-model S' is the most suitable for the accelerator ac1.

Figure 5E:
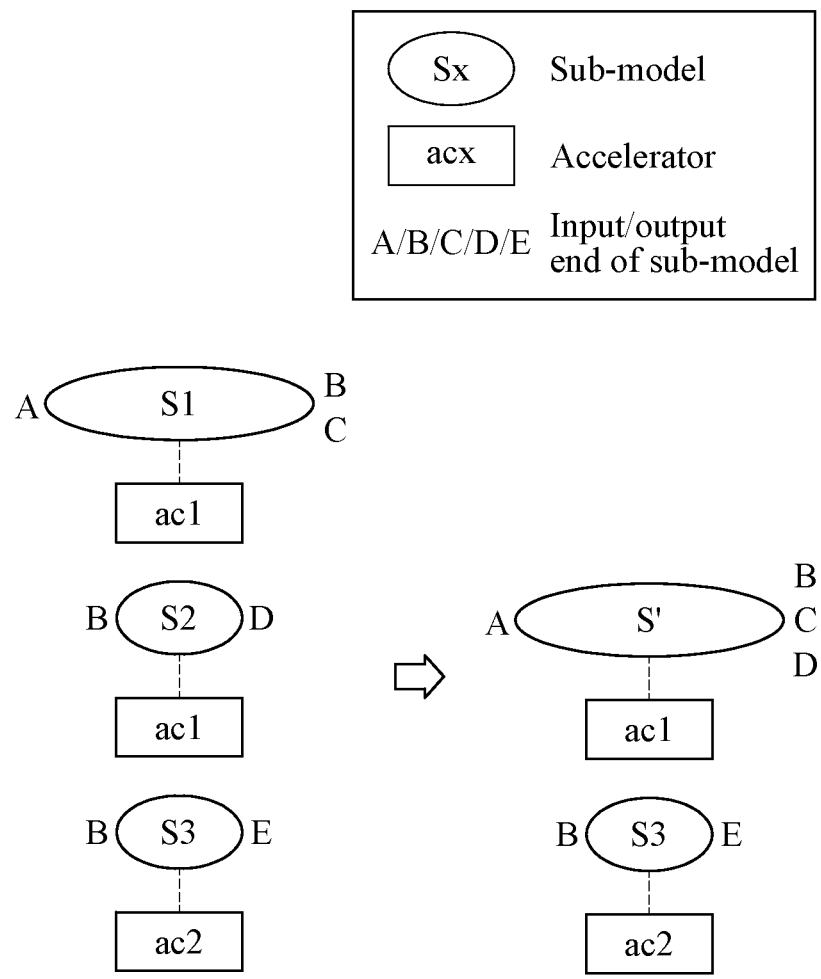

Referring to FIG. 5E, of three sub-models S1 through S3, an output end B of the sub-model S1 is an input end B of the sub-model S2 and an input end B of the sub-model S3. The sub-models S1 and S2 have optimal performances when they are executed in an accelerator ac1, but the sub-model S3 has an optimal performance when it is executed in an accelerator ac2. In such a case, the processor 230 may merge the sub-models S1 and S2 into a sub-model S' having an input end A and output ends B, C, and D. In addition, the processor 230 may determine that the sub-model S' is the most suitable for the accelerator ac and the sub-model S3 is the most suitable for the accelerator ac2. Here, a connecting point B between the sub-models S5 and S2 may be used by the sub-model S3, and thus the processor 230 may merge the sub-models S1 and S2 such that the connecting point B is used as an output end B of the sub-model S'.

Each of the second sub-models may have a matching relationship with a type of an accelerator in which each of the second sub-models has an optimal performance. That is, when the second sub-models are executed in corresponding accelerators, they may have optimal performances.

Figure 6A:
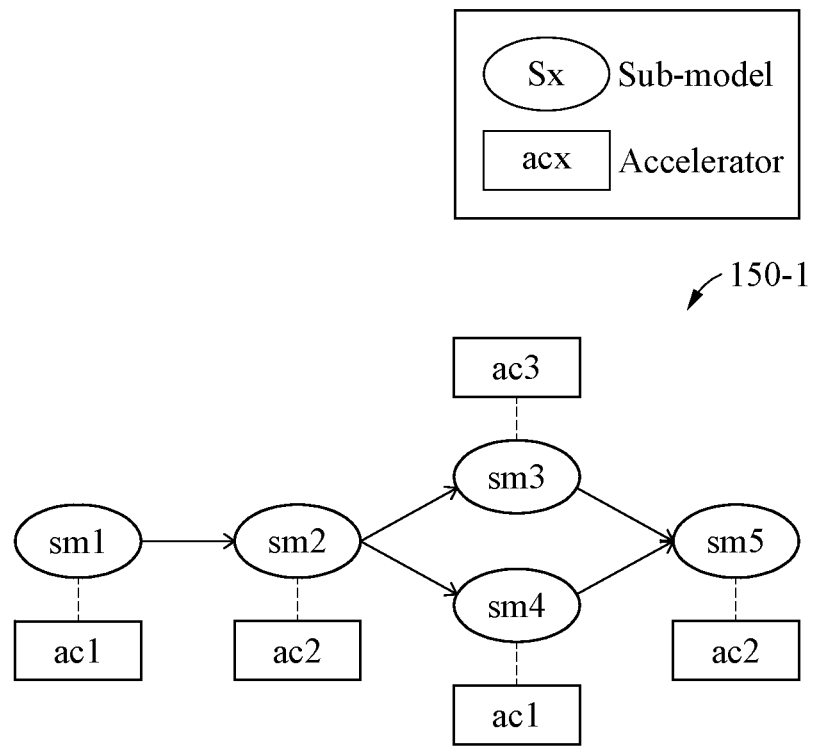
FIGS. 6A through 6C are diagrams illustrating examples of a deploying operation of the neural network implementing apparatus illustrated in FIG. 2.
Figure 6B:
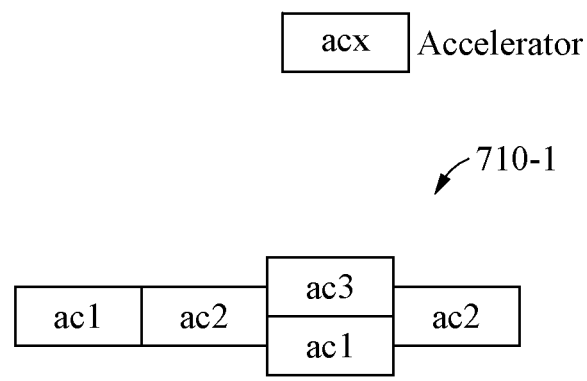
Figure 6C:
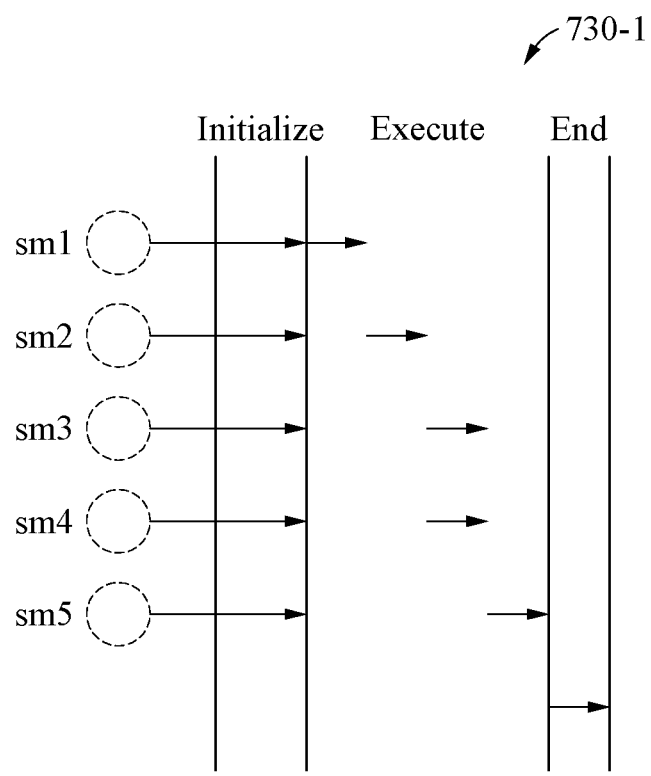
Figure 7A:
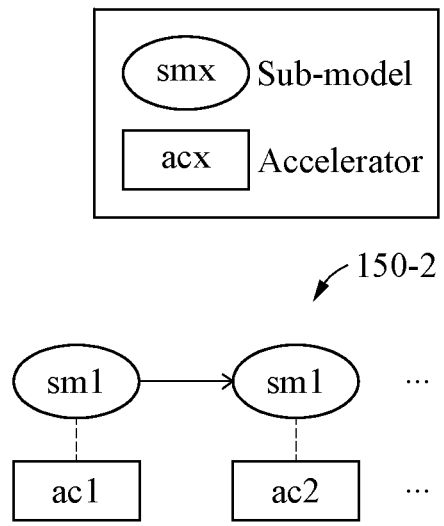
FIGS. 7A through 7C are diagrams illustrating other examples of a deploying operation of the neural network implementing apparatus illustrated in FIG. 2.
Figure 7B:
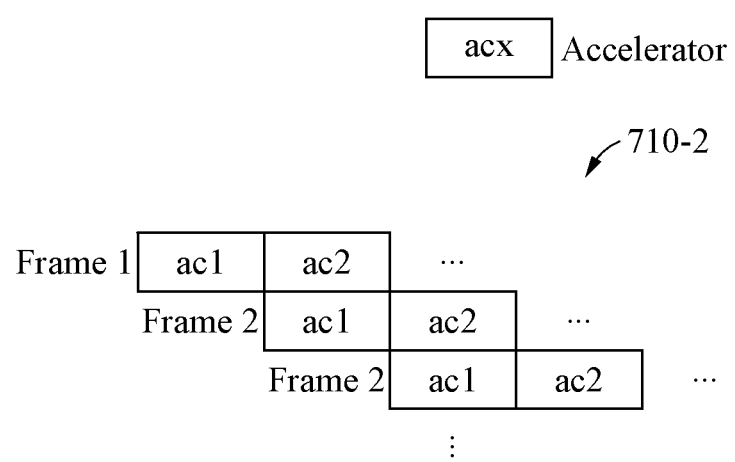
Figure 7C:
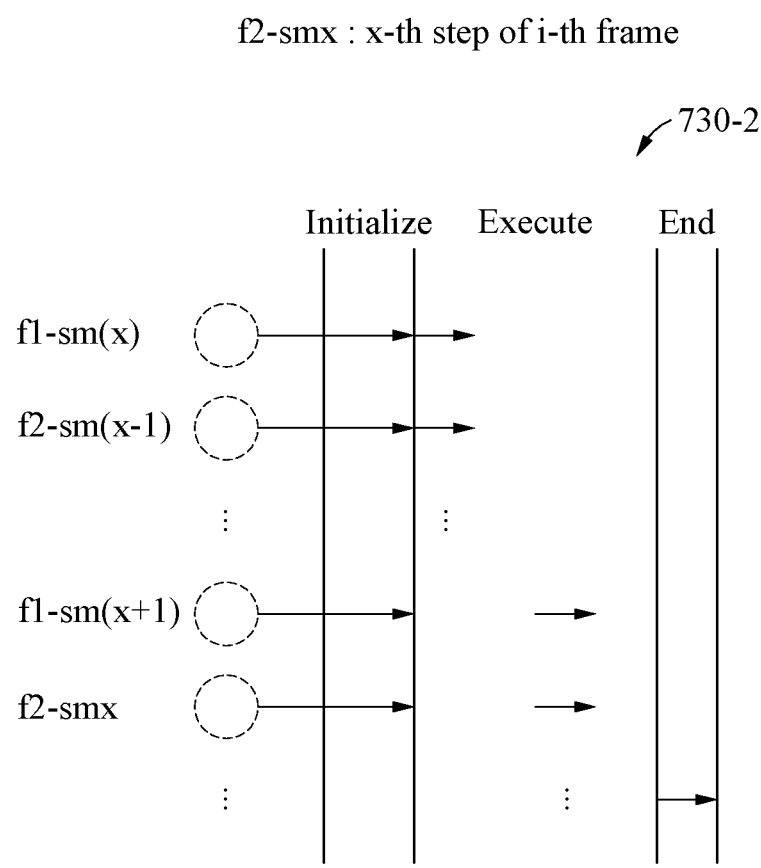

FIGS. 6A through 6C are diagrams illustrating examples of a deploying operation of the neural network implementing apparatus illustrated in FIG. 2. FIGS. 7A through 7C are diagrams illustrating other examples of deploying sub-models by the neural network implementing apparatus illustrated in FIG. 2.

The processor 230 may write a heterogeneous graph 150 based on second sub-models. For example, the processor 230 may write the heterogeneous graph 150 to which an input and output relationship between the second sub-models and a matching relationship with corresponding accelerators are applied. That is, the heterogeneous graph 150 may indicate a connecting relationship between the second sub-models and an accelerator corresponding to each of the second sub-models.

The processor 230 may deploy each of the second sub-models in a corresponding accelerator based on the heterogeneous graph 150. The second sub-models deployed in corresponding accelerators may be executed based on execution pipelines 710 and pipeline execution orders 730 that are differently set based on a type of input data. For example, in a case in which the input data is a single input task and the second sub-models have a parallel branch structure, the deployed second sub-models may be executed in sequential order in the corresponding accelerators. However, in a case in which the input data is a streaming input task and the second sub-models do not have the parallel branch structure, the deployed second sub-models may be executed in the corresponding accelerators while being overlapped.

FIGS. 6A through 6C illustrate an example of a heterogeneous graph written in a case in which input data is a single input and an example of a corresponding execution pipeline. FIGS. 7A through 7C illustrate an example of a heterogeneous graph written in a case in which input data is a streaming input and an example of a corresponding pipeline. Hereinafter, such examples will be described with the accompanying drawings.

Referring to FIGS. 6A through 6C, a heterogeneous graph 150-1 (illustrated in FIG. 6A) may be written based on the neural network model 10 to which a single input task is input, and second sub-models connected based on an input and output relationship therebetween may have a parallel branch structure.

The heterogeneous graph 150-1 includes five second sub-models sm1 through sm5. The second sub-models sm1 and sm4 have optimal performances when they are executed in an accelerator ac1. The second sub-models sm2 and sm5 have optimal performances when they are executed in an accelerator ac2. The second sub-model sm3 has an optimal performance when it is executed in an accelerator ac3. The two second sub-models sm3 and sm4 are in a parallel structure.

The second sub-models sm1 through sm5 may be deployed in the accelerators ac1 through ac3 based on the heterogeneous graph 150-1. The accelerators ac1 through ac3 may execute the second sub-models sm1 through sm5 by receiving single input data, based on an execution pipeline 710-1 (illustrated in FIG. 6B) and a pipeline execution order 730-1 (illustrated in FIG. 6C) that are set based on the heterogeneous graph 150-1. That is, as illustrated, the sub-model sm1 may be executed in the accelerator ac1, and then the sub-model sm2 may be executed in the accelerator ac2. Subsequently, the sub-models sm3 and sm4 may be simultaneously executed in the accelerators ac3 and ac1, respectively, and then the sub-model sm5 may be executed in the accelerator ac2.

Referring to FIGS. 7A through 7C, a heterogeneous graph 150-2 (illustrated in FIG. 7A) may be written based on the neural network model 10 to which a streaming input task is input, and second sub-models connected based on an input and output relationship therebetween may not have a parallel branch structure.

The heterogeneous graph 150-2 includes three second sub-models sm1 through sm3. The second sub-models sm1, sm2, and sm3 have optimal performances when they are executed in accelerators ac1, ac2, and ac3, respectively. The second sub-models sm1 through sm3 in the heterogeneous graph 150-2 may be connected linearly, and the number of the second sub-models sm1 through sm3 in the heterogeneous graph 150-2 may be the same as the number of the accelerators ac1 through ac3.

The second sub-models sm1 through sm3 may be deployed in the accelerators ac1 through ac3 based on the heterogeneous graph 150-2. The accelerators ac1 through ac3 may execute the second sub-models sm1 through sm3 by receiving streaming input data, based on an execution pipeline 710-2 and a pipeline execution order 730-2 that are set based on the heterogeneous graph 150-2. Here, the accelerators ac1 through ac3 may execute them by overlapping respective tasks for the streaming input data. That is, a first step of a frame f1 may be executed by the accelerator ac1 through the second sub-model sm1. Subsequently, a second step of the frame f1 may be executed by the accelerator ac2 through the second sub-model sm2, and simultaneously a first step of a frame 2 may be executed by the accelerator ac1 through the second sub-model sm1. Subsequently, a third step of the frame f1 may be executed by the accelerator ac3 through the second sub-model sm3, and simultaneously a second step of the frame f2 may be executed by the accelerator ac2 through the second sub-model sm2. In addition, a first step of a frame 3 may be simultaneously executed by the accelerator ac1 through the second sub-model sm1. The execution may be performed in such a way as described above until all the tasks are completed.

How second sub-models deployed in different types of accelerators are executed has been described above with reference to the accompanying drawings.

To improve an execution speed for deployed second sub-models, the processor 230 may uniformly perform an initializing operation to initialize each of the second sub-models, and uniformly perform a terminating operation to end each of the second sub-models.

Figure 8:
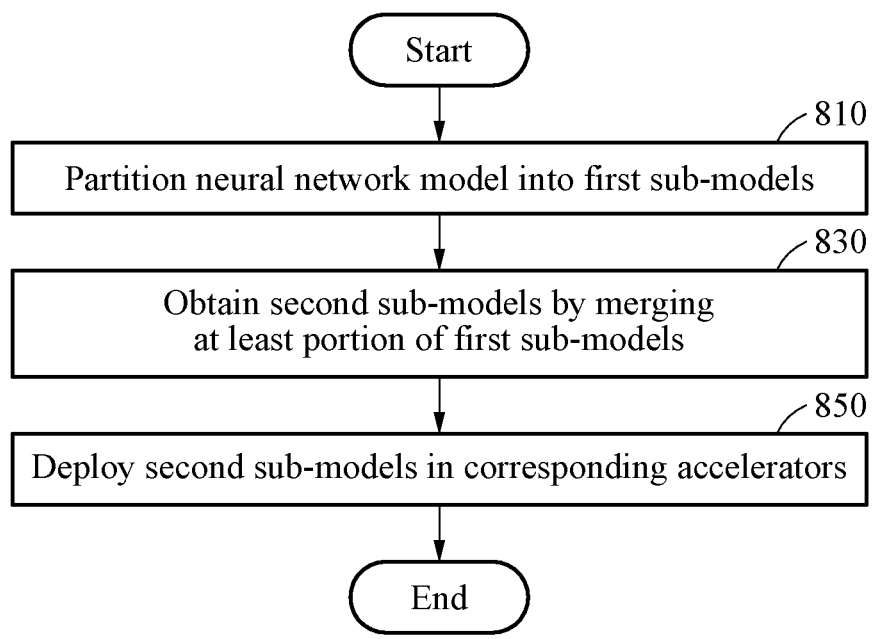
FIG. 8 is a flowchart illustrating an example of an overall operation of the neural network implementing apparatus illustrated in FIG. 2.

FIG. 8 is a flowchart illustrating an example of an overall operation of the neural network implementing apparatus illustrated in FIG. 2.

The neural network model implementing apparatus 100 may adaptively apply an algorithm to the neural network model 10 to effectively implement the neural network model 10 in a heterogeneous computing platform.

In operation 810, the neural network model implementing apparatus 100 partitions the neural network model 10 into first sub-models. For example, the neural network model implementing apparatus 100 may partition the neural network model 10 into the first sub-models such that the neural network model 10 is deployed as a smaller unit in an accelerator and satisfies a set verification standard while providing an improved performance.

In operation 830, the neural network model implementing apparatus 100 obtains second sub-models by merging at least a portion of the first sub-models. For example, the neural network model implementing apparatus 100 may obtain the second sub-models by grouping first sub-models among the first sub-models that provide optimal performances in an accelerator of the same type. Thus, each of the second sub-models may provide an optimal performance in each specific accelerator.

In operation 850, the neural network model implementing apparatus 100 deploys the second sub-models in corresponding accelerators in which the second sub-models are executed with optimal performances. For example, the neural network model implementing apparatus 100 may deploy the second sub-models based on a heterogeneous graph written based on an input and output relationship between the second sub-models and a corresponding accelerator, and set an execution pipeline, thereby implementing the neural network model 10 in a heterogeneous computing platform.

The units described herein may be implemented using hardware components and software components. For example, the hardware components may include microphones, amplifiers, band-pass filters, audio to digital convertors, non-transitory computer memory and processing devices. A processing device may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums. The non-transitory computer readable recording medium may include any data storage device that can store data which can be thereafter read by a computer system or processing device.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

While this disclosure includes specific examples, it will be apparent to one of ordinary skill in the art after an understanding of the present disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A method of implementing a neural network model, comprising:
    partitioning a neural network model into first sub-models by matching the first sub-models to types of accelerators, based on a partitioning standard;
    determining second sub-models by merging at least a portion of the first sub-models such that each of the first sub-models comprised in a respective second sub-model is matched to a same type of the types of accelerators, based on characteristics of the first sub-models; and
    deploying the second sub-models.

2. The method of claim 1, wherein the partitioning comprises:
    partitioning the neural network model into the first sub-models based on at least one of a number of times of an operation of an operating segment comprised in the neural network model, an input data size, or an output data size.

3. The method of claim 1, wherein the partitioning comprises:
    verifying the first sub-models based on a verification standard; and
    in response to the first sub-models not meeting the verification standard, modifying the partitioning standard.

4. The method of claim 3, wherein the verifying comprises:
    detecting performances of the first sub-models in response to the first sub-models being executed in one or more accelerators.

5. The method of claim 4, wherein the detecting of the performances comprises:
    for each of the first sub-models, detecting at least one of a consumed time, a consumed power, or an occupied memory size in response to the first-sub model being executed in an accelerator of the one or more accelerators.

6. The method of claim 3, wherein
    the number of times of the operation of the operating segment is a number of multiply-addition (MAdd) operations of the operating segment, and
    the input data size is of input data comprising either one of a single input task and streaming input data input to the neural network.

7. The method of claim 1, wherein the partitioning comprises:
    for each of the first sub-models, matching the first sub-model to a type of an accelerator of the one or more accelerators in which the first sub-model is executed with a specific performance.

8. The method of claim 1, wherein the determining comprises:
    determining the second sub-models by merging first sub-models among the first sub-models that are adjacent to each other in terms of an execution order and have a specific performance in response to being executed in an accelerator of a same type.

9. The method of claim 1, wherein the deploying comprises:
    writing a heterogeneous graph based on the second sub-models; and
    deploying the second sub-models based on the heterogeneous graph.

10. The method of claim 9, wherein the writing comprises:
    writing a connecting relationship between the second sub-models based on an input and output relationship between the second sub-models.

11. A non-transitory computer-readable storage medium storing instructions that, when executed by a processor, configure the processor to perform the method of claim 1.

12. The method of claim 1, wherein the deploying comprises executing the second sub-models in accelerators, based on received input data.

13. The method of claim 1, wherein
    the determining comprises determining one of the second sub-models by merging one of the first sub-models and another one of the first sub-models,
    an output end of the one of the first sub-models is an input end of the other one of the first sub-models,
    an input end of the one of the second sub-models is an input end of the one of the first sub-models, and
    an output end of the one of the second sub-models is an output end of the other one of the first sub-models.

14. The method of claim 1, wherein the same type of accelerator corresponds to any one of a central processing unit (CPU), a graphics processing unit (GPU), a neural processing unit (NPU), a microprocessor, a processor core, a multi-core processor, an application-specific integrated circuit (ASIC), a field-programmable gate array (FPGA), a tensor processing unit (TPU), a vision processing unit (VPU), and a data processing unit (DPU).

15. An apparatus for implementing a neural network model, comprising:
    a memory configured to store therein instructions; and
    a processor configured to execute the instructions,
    wherein, when the instructions are executed, the processor is configured to:
        partition a neural network model into first sub-models by matching the first sub-models to types of accelerators, based on a partitioning standard;
        determine second sub-models by merging at least a portion of the first sub-models such that each of the first sub-models comprised in a respective second sub-model is matched to a same type of the types of accelerators, based on characteristics of the first sub-models; and
        deploy the second sub-models.

16. The apparatus of claim 15, wherein, for the partitioning, the processor is configured to:
    partition the neural network model based on at least one of a number of times of an operation of an operating segment comprised in the neural network model, an input data size, or an output data size.

17. The apparatus of claim 15, wherein, for the partitioning, the processor is configured to:
    verify the first sub-models based on a verification standard; and
    in response to the first sub-models not meeting the verification standard, modify the partitioning standard.

18. The apparatus of claim 17, wherein, for the verifying, the processor is configured to:

detect performances of the first sub-models in response to the first sub-models being executed in one or more accelerators.

19. The apparatus of claim 18, wherein, for the detecting of the performances, the processor is configured to:
for each of the first sub-models, detect at least one of a consumed time, a consumed power, or an occupied memory size in response to the first-sub model being executed in an accelerator of the one or more accelerators.

20. The apparatus of claim 15, wherein, for the partitioning, the processor is configured to:
for each of the first sub-models, match the first sub-model to a type of an accelerator of the one or more accelerators in which the first sub-model is executed with a specific performance.

21. The apparatus of claim 15, wherein, for the determining, the processor is configured to:
determine the second sub-models by merging first sub-models among the first sub-models that are adjacent to each other in terms of an execution order and have a specific performance in response to being executed in an accelerator of a same type.

22. The apparatus of claim 15, wherein the processor is configured to:
write a heterogeneous graph based on the second sub-models; and
deploy the second sub-models based on the heterogeneous graph.

23. The apparatus of claim 22, wherein the processor is configured to:
write a connecting relationship between the second sub-models based on an input and output relationship between the second sub-models.

24. The apparatus of claim 23, wherein the processor comprises:
a plurality of accelerators in which the second sub-models are deployed.

* * * * *